Oct. 25, 1955 — D. C. CASWELL — 2,721,510
POP CORN MACHINE
Filed Oct. 30, 1952 — 3 Sheets-Sheet 1
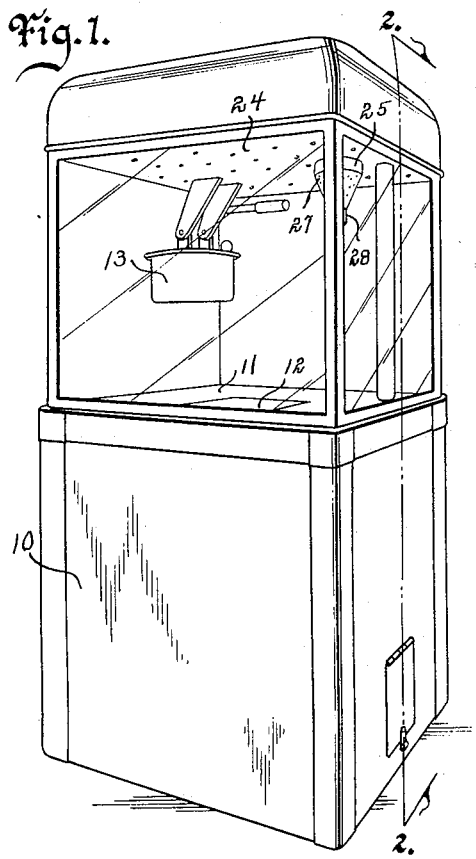
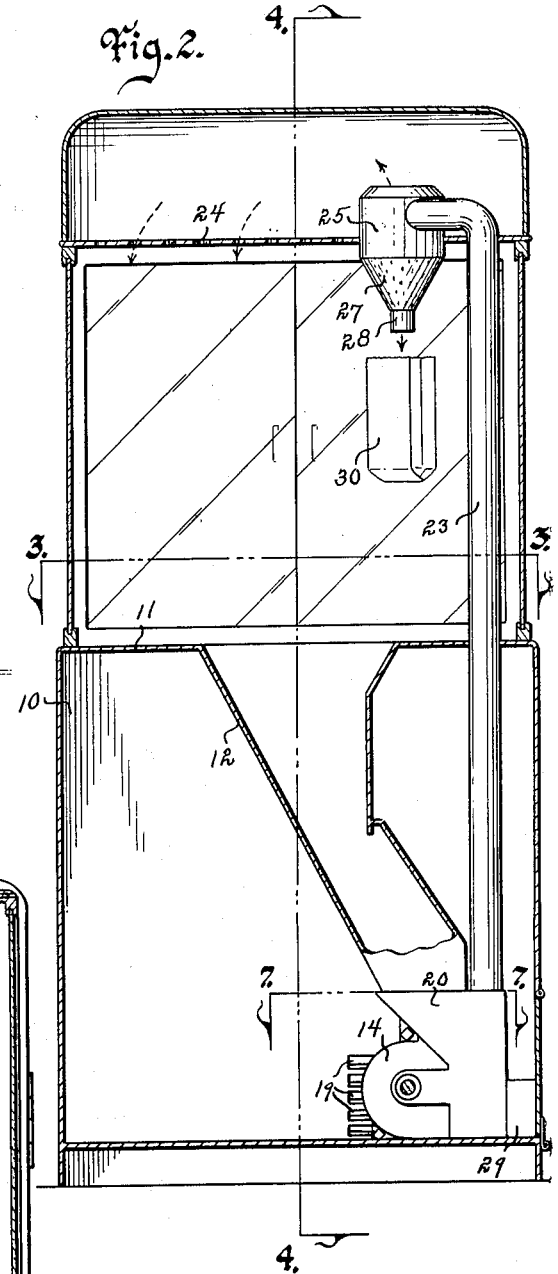
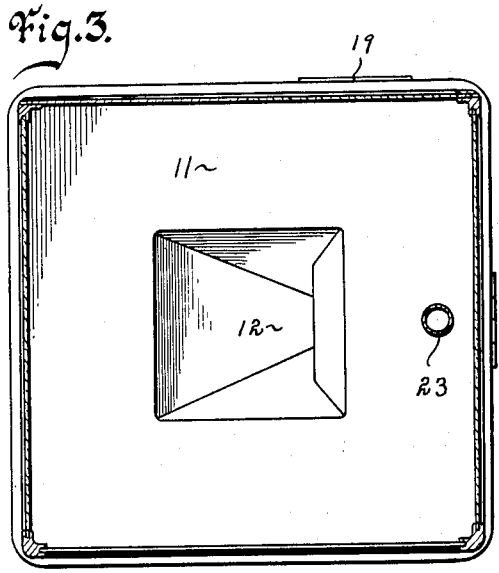
Inventor
Donald C. Caswell
by Talbert Dick Adler
Attorneys
Witness
Edward P. Seeley

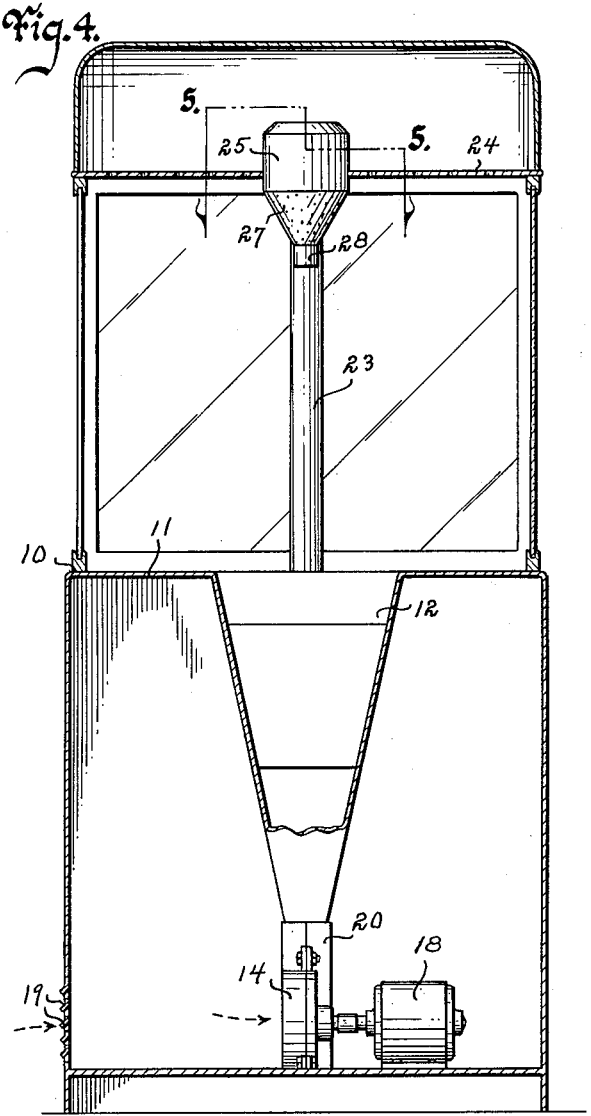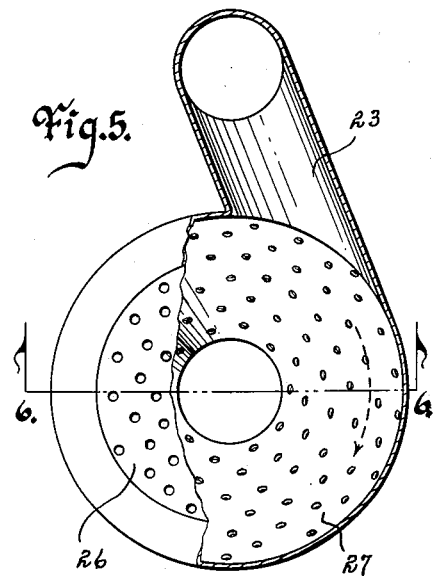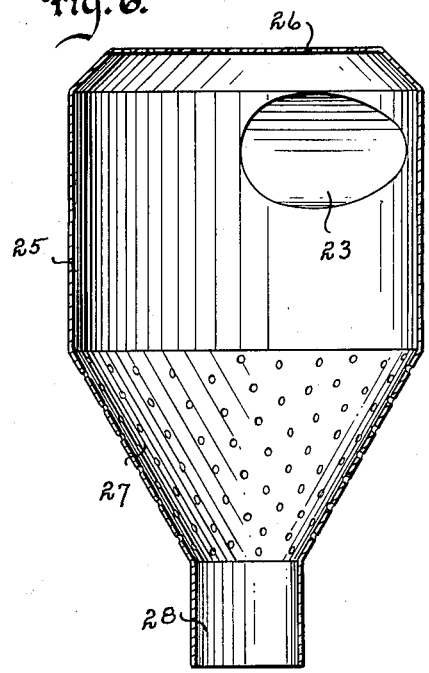

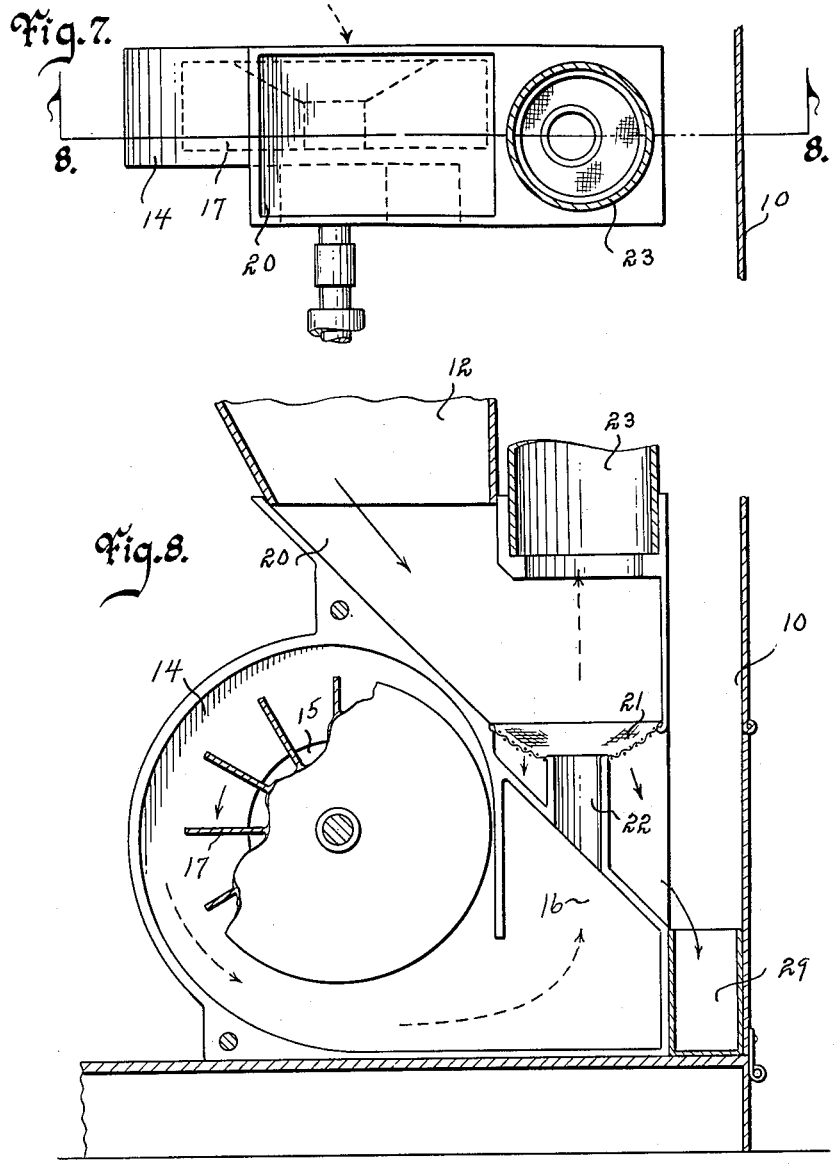

United States Patent Office 2,721,510
Patented Oct. 25, 1955

2,721,510
POP CORN MACHINE
Donald C. Caswell, Ringsted, Iowa
Application October 30, 1952, Serial No. 319,457
9 Claims. (Cl. 99—238.6)

This invention relates to machines for popping corn and more specifically to a machine that will separate the popped kernels from the unpopable ones.

Machines for the popping of corn are very old. Heretofore the larger commercial ones consisted mainly of a glass enclosed housing wherein the corn was popped in a hanging vessel, emptied into the bottom of the enclosure from which it is manually sacked and sold. The objection to such pop corn machines is that the unpopped kernels are scooped up with the popped kernels and placed in the bag for the purchaser. Furthermore, this manual operation damages at least some of the popped kernels, gives the impression of poor sanitation, and as the pop corn is in the bottom of the housing container it indicates that it is possibly stale.

Therefore, the principal object of my invention is to provide a pop corn machine that automatically separates the unpopped kernels from the popped kernels.

A further object of the invention is to provide a pop corn machine that will fill a bag with popped corn merely by holding an open bag for the reception of the popped corn.

A still further object of my invention is to provide a pop corn machine that provides visual movement of the popped corn and maintains the same in a warmed condition.

A still further object of my invention is to provide a pop corn machine that is economical in manufacture, durable in use, and attractive in operation and appearance.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is a perspective view of my machine ready for use,

Fig. 2 is an enlarged longitudinal sectional view of the machine taken on line 2—2 of Fig. 1, Fig. 3 is a cross-sectional view of the machine taken on line 3—3 of Fig. 2, Fig. 4 is a longitudinal sectional view of the pop corn machine taken on line 4—4 of Fig. 2, Fig. 5 is a cross-sectional view of the dispensing head of the machine taken on line 5—5 of Fig. 4, Fig. 6 is a longitudinal sectional view of the dispensing head taken on line 6—6 of Fig. 5, Fig. 7 is a top view of the fan mechanism taken on line 7—7 of Fig. 2, and Fig. 8 is an enlarged side view of the fan mechanism with parts cut away to more fully illustrate its construction.

Referring to the drawings in detail the numeral 10 designates the machine housing which follows the usual and well known structure of an upright rectangular enclosure having an enclosed bottom portion and a side glass enclosed upper portion. The numeral 11 designates the horizontal partition between the upper and lower compartments of the housing structure. In the center of this partition is an opening communicating with a downwardly extending chute 12. Within the glass enclosure portion is the usual suspended popping bowl 13. Also, at least some of the glass panels, are slidable for entrance into the upper compartment.

Thus far the description of the pop corn machine is of a standard one, and it is to such a machine that I install my invention and which I will now describe.

In the bottom portion of the machine housing I install an air fan housing 14 having one side open for the air intake 15 and an air outlet opening chamber 16 as shown in Fig. 8. Rotatably mounted in this housing is a common centrifugal fan 17, powered by a motor 18. Louver openings 19 are provided in the housing 10 for furnishing additional air to the air fan as needed. The numeral 20 designates an inclined chute extending outwardly and downwardly and may be cast as an integral part of the fan housing. At the extreme bottom of the chute 20 is a downwardly extending circular concave bowl 21. This bowl may be of a screen construction or sheet metal having a plurality of holes. The purpose of this perforated bowl is to have such size openings as to pass unpopped kernels while rejecting the enlarged popped kernels. The bowl extends inwardly and downwardly from its outer edge terminating at its center in an opening that communicates with the top of a vertical air escape conduit 22. The bottom end of this conduit communicates with the inside of the air outlet chamber 16 of the air fan housing. The lower end of the chute 12 communicates with the inside top of the chute 20. The numeral 23 designates a vertical pipe having its lower end communicating with the inside top of the lower end of the chute 20. This lower end of the pipe 23 is spaced apart from directly above, and of a diameter greater than that of the diameter of the conduit 22 as shown in Fig. 8. This pipe 23 is in the same vertical plane as the pipe 22. The pipe 23 extends upwardly to the inside top of the upper portion of the machine, and if desired, even above the dome ceiling 24, at which point it is bent at a right angle to enter and engage the dispenser head. This dispensing head has a circular side wall 25, an air escape perforated top 26, a depending perforated funnel 27, from its side wall, with the bottom of the funnel terminating in a short pipe nozzle 28. The pipe 23 enters the side of the head at an angle as shown in Fig. 5 to aid in introducing the popped corn and air in a circular motion thereby aiding in separating substantially all of the air under pressure from the popped kernels prior to their gentle dropping downwardly through the nozzle 28.

The practical operation of my machine is as follows:
As corn is popped in the vessel 13, it is emptied in the usual manner onto the table floor 11. The corn thence drops downwardly into and through the chute 12. With the motor rotating the air fan, a continuous volume of air under pressure will be forced into the chamber 16, thence upwardly through the conduit 22. Popped and unpopped kernels will move into the chute 20 from the chute 12 and thence will fall into the perforated bowl portion 21, which surrounds the upper end of the conduit 22. The popped kernels being lighter will more rapidly roll to the center opening of the bowl where they will be caught in the up-draft of the forced air emerging from the conduit 22. The unpopped kernels, or most of them, will immediately pass through the perforations of the bowl and thereby exit from the operation. Any unpopped kernels reaching the up-draft before passing through the bowl screen, may be raised slightly, but due to their weight will fall back into the bowl before reaching the entrance of the pipe 23. It is merely only a matter of time until all of the unpopped kernels will pass through the bowl screen from which they fall into a collecting container or like 29. By the member 21 being a bowl of funnel shape the corn will not pile up thereon but will move automatically to the center thereof. The light weight popped kernels will be blown upwardly into and through the pipe 23 and thence into the distributing head. The air pressure will be dissipated through the small perforations of the members 26 and 27, and the popped kernels, free of unpopped kernels, will gently drop from the nozzle 28. If a bag 30 is held below the nozzle, it will be filled with the popped corn. This means that the popped corn may be dispensed without human hands actually touching it thereby providing maximum sanitation. Also, it gives the customer the impression that the pop corn has just been popped and is fresh. If no bag is placed in the path of the falling pop corn, it passes to the chute 12, to again go through the procedure just described. By the air flow being compressed by the fan, it will be heated thereby maintaining the pop corn in a warm condition for eating.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my pop corn machine without departing from the real spirit and purpose of my invention, and it is my intention to cover by my claims, any modified forms of structure or use of mechanical equivalents which may be reasonably included within their scope.

I claim:

1. In a pop corn machine, a housing, a means for popping corn, a downwardly inclined chute for receiving the product coming from the popping means, a perforated bowl communicating with said chute and having its side wall extending downwardly and inwardly to terminate in an opening, a forced air means communicating with said opening of said bowl for forcing an air stream upwardly from the bottom center of said bowl, a vertical pipe spaced apart from and directly above the center bottom of said bowl for receiving popped corn blown into the same from air passing through the opening in said bowl, and a distributing head on the upper end of said pipe.

2. In a pop corn machine, a housing, a means for popping corn, a horizontal perforated member for receiving the product from said popping means; said member having an inclined perforated portion terminating in an opening, a means for vertically discharging a stream of air under pressure through said opening, a vertical pipe spaced apart from and directly above the opening of said perforated member for receiving popped corn blown into the same from air passing through the opening in said bowl, and a downwardly extending discharge means on the upper end of said pipe.

3. In a pop corn machine, a housing, a means for popping corn, a horizontal perforated member for receiving the product from said popping means; said member having an inclined perforated portion terminating in an opening, a means for vertically discharging a stream of air under pressure through said opening, a vertical pipe spaced apart from and directly above the opening of said perforated member for receiving popped corn blown into the same from air passing through the opening in said bowl, and a downwardly extending perforated discharge means on the upper end of said pipe.

4. In a pop corn machine, a housing, a means for popping corn, a horizontal perforated member for receiving the product from said popping means; said member having an inclined perforated portion, a means for vertically discharging a stream of air under pressure through an outlet and adjacent the inclined perforated portion of said horizontal member, a vertical pipe spaced apart from and directly above the outlet of said means for discharging a stream of air for receiving popped corn blown into the same from air passing through said outlet, and a nozzle end means on the upper end of said pipe.

5. In a pop corn machine, a housing, a means for popping corn, a downwardly inclined chute for receiving the product coming from the popping means, a perforated bowl communicating with said chute and having its side wall extending downwardly and inwardly to terminate in an opening, a forced air means communicating with said opening of said bowl for forcing an air stream upwardly from the bottom center of said bowl, a vertical pipe spaced apart from, and of a diameter greater than the diameter of the opening in said bowl for receiving popped corn blown into the same from air passing through the opening in said bowl, and directly above the center bottom of said bowl, and a distributing head on the upper end of said pipe.

6. In a pop corn machine, a housing, a means for popping corn, a horizontal perforated member for receiving the product from said popping means; said member having an inclined perforated portion terminating in an opening, a means for vertically discharging a stream of air under pressure through said opening, a vertical pipe spaced apart from and directly above the opening of said perforated member for receiving popped corn blown into the same from air passing through the opening in said bowl, an enlarged perforated head member on the upper end of said pipe, and a downwardly extending discharge tube on said head member.

7. In a pop corn machine, a housing, a means for popping corn, a horizontal perforated member for receiving the product from said popping means; said member having an inclined perforated portion terminating in an opening, a receiving container communicating with the underside of said inclined perforated portion of said horizontal member, a means for vertically discharging a stream of air under pressure through said opening, a vertical pipe spaced apart from and directly above the opening of said perforated member for receiving popped corn blown into the same from air passing through the opening in said bowl, and a downwardly extending discharge means on the upper end of said pipe.

8. In a pop corn machine, a housing, a means for popping corn, a horizontal perforated member for receiving the product from said popping means; said member having an inclined perforated portion terminating in an opening, a means for vertically discharging a stream of air under pressure through said opening, a vertical pipe spaced apart from and directly above the opening of said perforated member for receiving popped corn blown into the same from air passing through the opening in said bowl, a downwardly extending discharge means on the upper end of said pipe located in the upper portion of said housing, and capable of directing heavier than air products downwardly for possible communication with said horizontal perforated member.

9. In combination with a pop corn machine having a glassed in compartment, a corn popping means suspended within, and a bottom in said compartment, a continuous corn circulating means, comprising; a downwardly inclined chute communicating with the bottom of the said compartment of said pop corn machine, a perforated bowl for receiving popped and defective kernels of corn from the said chute; said bowl extending inwardly and downwardly to terminate in an opening, a vertical conduit terminating in and with said opening for directing a vertical current of air upwardly, an air stream producing means connected to said vertical conduit, a second vertical conduit spaced apart from and directly above the first vertical conduit for receiving popped corn blown into the same from air passing through the opening in said bowl and terminating in the upper portion of said glassed in compartment for directing popped corn downwardly from the upper portion of said glassed in compartment.

References Cited in the file of this patent

UNITED STATES PATENTS

| | | |
|---|---|---|
| 1,109,247 | Post | Sept. 1, 1914 |
| 1,512,323 | Wallace | Oct. 21, 1924 |
| 1,648,005 | Pritchard | Nov. 8, 1927 |
| 2,027,698 | Parks et al. | Jan. 14, 1936 |
| 2,668,636 | Martin | Feb. 9, 1954 |
| 2,668,649 | Clark et al. | Feb. 9, 1954 |